US012580928B2

(12) United States Patent
Najafirad et al.

(10) Patent No.: US 12,580,928 B2
(45) Date of Patent: Mar. 17, 2026

(54) SYSTEM AND METHODS FOR AUTOMATIC DETECTION OF DISTRIBUTED ATTACKS IN IoT DEVICES USING DECENTRALIZED DEEP LEARNING

(71) Applicant: Board of Regents, The University of Texas System, Austin, TX (US)

(72) Inventors: Peyman Najafirad, San Antonio, TX (US); Gonzalo De La Torre Parra, San Antonio, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 318 days.

(21) Appl. No.: 18/297,441

(22) Filed: Apr. 7, 2023

(65) Prior Publication Data

US 2023/0328081 A1 Oct. 12, 2023

Related U.S. Application Data

(60) Provisional application No. 63/329,267, filed on Apr. 8, 2022.

(51) Int. Cl.
| | |
|---|---|
| *H04L 9/40* | (2022.01) |
| *G06F 21/55* | (2013.01) |
| *G06F 21/60* | (2013.01) |

(52) U.S. Cl.
CPC ...... *H04L 63/1416* (2013.01); *H04L 63/1425* (2013.01); *H04L 63/1458* (2013.01)

(58) Field of Classification Search
CPC ............. H04L 63/1416; H04L 63/1425; H04L 63/1458; G06F 21/554; G06F 21/606; G06F 2221/2119
See application file for complete search history.

(56) References Cited

U.S. PATENT DOCUMENTS

| | | | | |
|---|---|---|---|---|
| 2018/0063168 A1* | 3/2018 | Sofka | ................... | G06N 3/0895 |
| 2018/0097822 A1* | 4/2018 | Huang | .................... | G06N 20/00 |
| 2021/0058415 A1* | 2/2021 | Sanzgiri | ................... | G06N 3/09 |
| 2023/0106639 A1* | 4/2023 | Wagener | ................. | G06N 3/04 |
| | | | | 726/1 |

* cited by examiner

*Primary Examiner* — Vu V Tran
(74) *Attorney, Agent, or Firm* — Thomas | Horstemeyer, LLP

(57) ABSTRACT

The present disclosure presents distributed attack detection systems and related methods. One such method comprises executing, by a client computing device, a convolutional neural network model that is configured to detect a network attack on the client computing device; receiving an HTTP request; extracting a uniform resource locator contained within the HTTP request; inputting the uniform resource locator in the convolutional neural network model; receiving an output from the convolutional neural network model that classifies the uniform resource locator as being directed to a network attack on the client computing device; and transmitting, by the client computing device, embeddings of a hidden layer of the convolutional neural network model to one or more computer servers that are hosting a recurrent neural network model for detecting a distributed network attack across a plurality of client computing devices.

20 Claims, 7 Drawing Sheets

Figure 1:
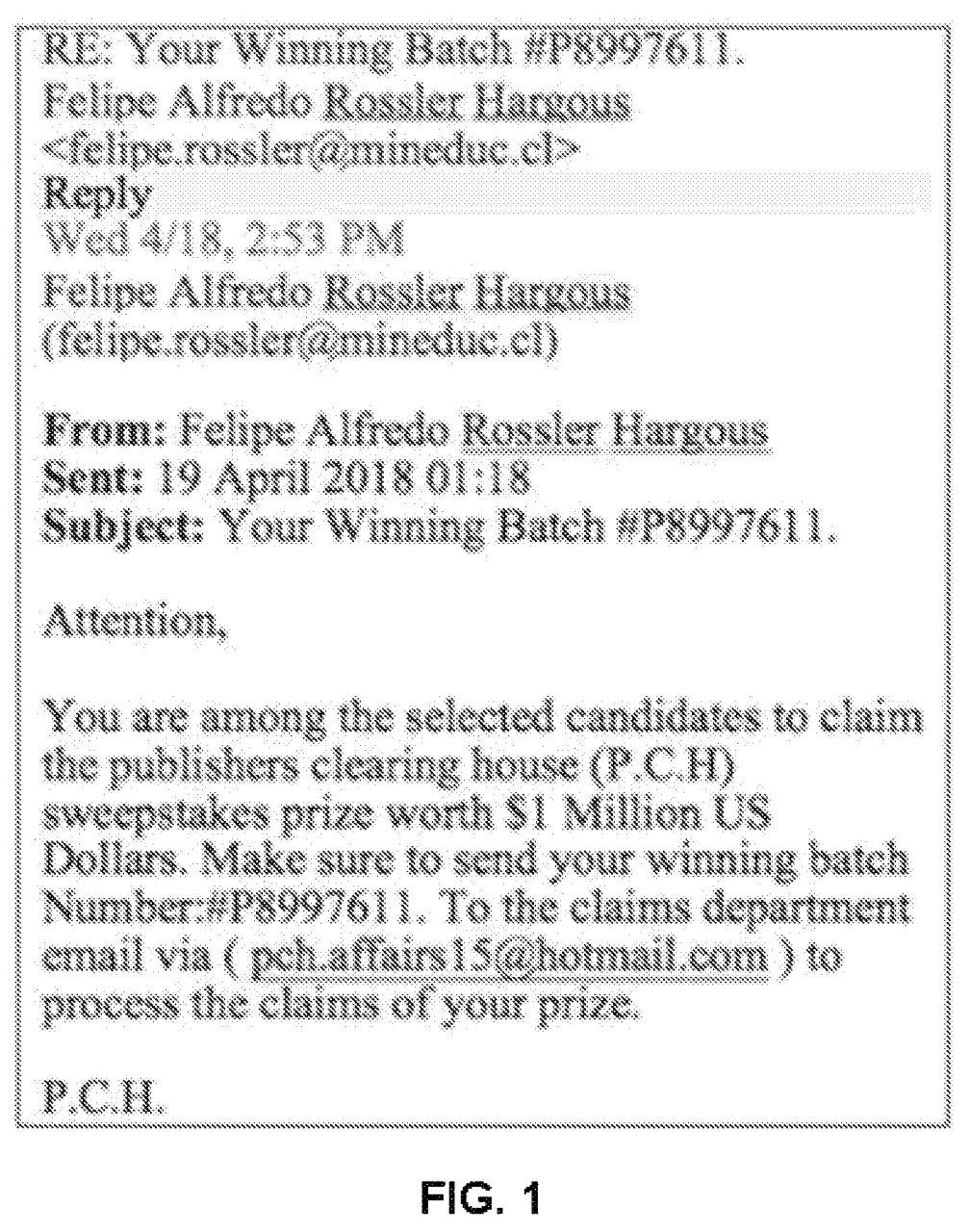

RE: Your Winning Batch #P8997611.
Felipe Alfredo Rossler Hargous
<felipe.rossler@mineduc.cl>
Reply
Wed 4/18, 2:53 PM
Felipe Alfredo Rossler Hargous
(felipe.rossler@mineduc.cl)

From: Felipe Alfredo Rossler Hargous
Sent: 19 April 2018 01:18
Subject: Your Winning Batch #P8997611.

Attention,

You are among the selected candidates to claim
the publishers clearing house (P.C.H)
sweepstakes prize worth $1 Million US
Dollars. Make sure to send your winning batch
Number:#P8997611. To the claims department
email via ( pch.affairs15@hotmail.com ) to
process the claims of your prize.

| Request Method | GET |
|---|---|
| Protocol Version | HTTP/1.1 |
| Request URL | http://localhost:8080/tienda1/publico/anadir.jsp?id |
| Request Headers | User-Agent: Mozilla/5.0 (compatible; Konqueror/3.5; Linux) KHTML/3.5.8 (like Gecko) |
| | Accept: text/xml,application/xml,application/xhtml+xml,text/html;q=0.9,text/plain;q=0.8,image/png,*/*;q=0.5 |
| | Accept-Encoding: x-gzip, x-deflate, gzip, deflate |
| | Accept-Charset: utf-8, utf-8;q=0.5, *;q=0.5 |
| | Accept-Language: en |
| | Host: localhost:8080 |
| | Cookie: JSESSIONID=54E25FF4B7F0E4E855B112F882E9EEA5 |
| General Headers | Pragma: no-cache |
| | Cache-control: no-cache |
| | Connection: close |
| Message | id=1&nombre=Jam%F3n+Ib%E9rico&precio=39&cantidad=41&B1=A%F1adir+al+carrito |

FIG. 2A

| Request Method | GET |
|---|---|
| Protocol Version | HTTP/1.1 |
| Request URL | http://localhost:8080/tienda1/publico/autenticar.jsp? |
| Request Headers | User-Agent: Mozilla/5.0 (compatible; Konqueror/3.5; Linux) KHTML/3.5.8 (like Gecko)<br><br>Accept: text/xml,application/xml,application/xhtml+xml,text/html;q=0.9,text/plain;q=0.8,image/png,*/*;q=0.5<br><br>Accept-Encoding: x-gzip, x-deflate, gzip, deflate<br><br>Accept-Charset: utf-8, utf-8;q=0.5, *;q=0.5<br><br>Accept-Language: en<br><br>Host: localhost:8080<br><br>Cookie: JSESSIONID=FBD7B67801CAF901F3F378668C5FF56F |
| General Headers | Pragma: no-cache<br><br>Cache-control: no-cache<br><br>Connection: close |
| Message | modo=entrar&login=mcnair&pwd=81cob6r&remember=off&B1=%27%3B+DROP+TABLE+usuarios%3B+SELECT+*+FROM+datos+WHERE+nombre+LIKE+%27%25 |

FIG. 2B

SYSTEM AND METHODS FOR AUTOMATIC DETECTION OF DISTRIBUTED ATTACKS IN IoT DEVICES USING DECENTRALIZED DEEP LEARNING

CROSS-REFERENCE TO RELATED APPLICATION

This application claims priority to U.S. provisional application entitled, "System and Methods for Automatic Detection of Distributed Attacks in IoT Devices Using Decentralized Deep Learning," having Ser. No. 63/329,267, filed Apr. 8, 2022, which is entirely incorporated herein by reference.

BACKGROUND

The arrival of Internet of Things (IoT) devices have boosted the development of many fields, such as Smart Homes and Smart Cities. These internet-connected devices are pieces of hardware, such as sensors, appliances, gadgets, mobile smartphones, etc., that have the ability to collect, send, and act on data that is acquired from their environment. Thus, IoT devices can generate, process, and exchange a vast amount of data during their operation. They also establish communication between each other and with their users through various types of networks. There are a plethora of applications where IoT devices are used, including smart vehicles, healthcare, environmental monitoring, and personal wearable devices to name a few. Since, an increasing amount of sensitive data and personal information is being managed by these devices, the attention of the industry and academia is directed to develop security solutions for IoT devices. However, security requirements are often overlooked or not prioritized as highly as product innovation.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 1 shows an example of a phishing e-mail in accordance with the present disclosure.

FIGS. 2A and 2B show examples of a benign and a malicious HTTP request, respectively, in accordance with the present disclosure.

DETAILED DESCRIPTION

Figure 3:
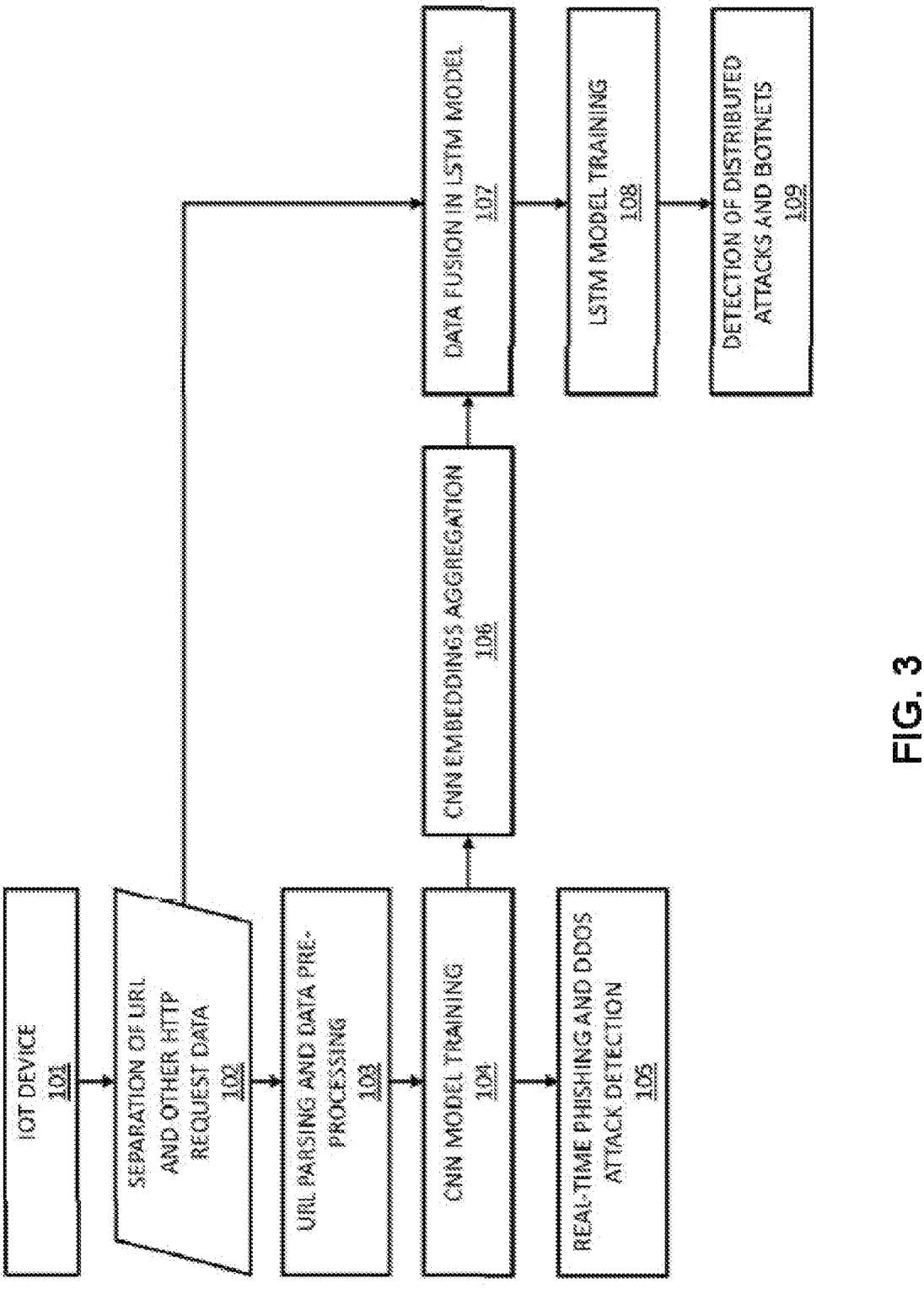
FIG. 3 illustrates a high-level topology of an exemplary distributed deep learning framework for detecting Internet of Thing (IoT) attacks (phishing and distributed denial of service (DDoS)) and botnets in a distributed fashion in accordance with various embodiments of the present disclosure.

The present disclosure presents a system and related methods for automatic detection of distributed attacks in Internet of Things (IoT) devices.

IoT devices are pieces of hardware, such as sensors, appliances, gadgets, mobile smartphones, etc., that have the ability to collect, send/receive (via the Internet), and act on data that is acquired from their environment. Thus, IoT devices can generate, process, and exchange a vast amount of data during their operation. Accordingly, IoT devices have become very attractive for attackers due to their laxed security and increasing popularity in our society. According to Symantec's 2019 Internet Security Threat Report, the number of malware and bugs constituted the majority of IoT attacks during 2018. It was also noted that routers and cameras were the most infected devices, respectively accounting for 75% and 15% of IoT attacks. Furthermore, it was also reported that the Mirai DDoS (distributed denial of service) worm continues to evolve, resulting in the emergence of a VPN (Virtual Private Network) filter. The latter is armed with potent payloads, including ones targeted for data exfiltration, credential theft, etc. Similarly, Cisco' 2018 report revealed that network-based ransomware worms (unlike previously used malware spreading methods such as drive-by-download, email, or USB drives) do not require human interaction to infect devices. Examples of such ransomware include WannaCry and Nyetya, which exploited "Eternal Blue" (a Microsoft Windows security vulnerability). The U.S. government and other security entities reported that WannaCry utilized the ransom component as a smokescreen to disguise its true purpose of wiping data belonging to infected users. Similarly, Nyetya was disguised as a ransomware in order to wipe out data from its victims. Nyeta's attack was also facilitated by exploiting the "Eternal Blue" vulnerability, a remote code execution vulnerability known as "Eternal Romance," as well as vectors involving credential harvesting.

Attempting to detect attacks based on their network behavior is an ongoing effort, which is evident by the number of anomaly-based intrusion detection systems proposed in the literature. For example, proposed models use deep learning approaches to detect network traffic anomalies and identify zero-day attacks by learning patterns from normal-traffic and abnormal-traffic during the training phase. There have also been attempts to use artificial intelligence (AI) based tools to complement threat prevention, detection, and remediation, particularly for detecting malicious encrypted web traffic use. Existing proposals concentrate on detecting attacks at device level on the client's side or at the back-end hosted on a computer server environment that is accessible via the Internet and is referred to as the cloud. Such approach limits the ability to detect attacks taking place across distributed IoT devices while simultaneously offering on-device security.

Phishing solutions have encountered many difficulties to detect these attacks as phishers are constantly developing new and creative ways to trick users to fall for illegitimate websites or emails. For example, phishers are forging websites that appear to be identical to original sources by using logos and graphics that make email look more convincing. In addition, new approaches that scrap public personal data from potential victims are used for generating plausible and convincing attacks. Social phishing and context aware phishing are two methods that use public personal information for increasing the effectiveness of these attacks. A study has shown that victims are 4.5 times more likely to fall for these attacks if the source involves a personal contact or personally relates to the victim. Such methods fall within the classification of spear-phishing with attacks targeting specific victims. Other phishing attacks include malware and trojans to directly compromise a victim's computer which is used for generating new attacks. FIG. 1 presents an example of a phishing e-mail.

In the pre-existing literature, a variety of phishing detection methods based on machine learning have been analyzed. Using the WEKA machine learning tool, inventors have evaluated the performance of eight machine learning techniques on phishing datasets. Findings suggest that the C4.5 decision tree algorithm and the eDRI outperform the other six algorithms, but it is also observed that the C4.5 algorithm generates 297 rules for phishing classification while the eDRI only generates 25 rules for phishing classification; thus, eDRI appears to be ideal for computationally constrained devices. The inventors have failed to find how this approach can be extended beyond the implementation within a web browser.

DDoS attacks can be broadly categorized into network/transport level DDoS-based flooding attacks and application layer DDoS flooding attacks. Network/transport level DDoS-based flooding attacks use ICMP, DNS protocol packets, TCP, and UDP to disrupt the connection from legitimate users. On the other hand, application layer DDoS flooding attacks are designed to consume the target's server resources such, as memory, disk/database and I/O bandwidth and sockets. A number of solutions have been proposed in the literature to detect both categories of DDoS attacks.

Studies have applied a Chinese remainder theorem based on a reversible sketch which compresses and fuses big-volume network traffic and discovers anomalous keys. In a pre-existing paper, the inventors proposed a modified multi-chart cumulative sum algorithm that supports self-adaptive and protocol independent detection to detect DDoS flooding attacks. Others have presented an abnormal network flow feature sequence prediction approach. Additional works present an IoT-based low-cost machine learning algorithm that uses feeds from traffic data that are flow-based and protocol-agnostic. A major disadvantage of this approach is that it requires a middlebox for packet capturing (PCAP), processing network traffic, and generating features. Nevertheless, the tested K-nearest neighbors algorithm, support vector machine with linear kernel, decision tree, random forest, and DNN (Deep Neural Network) present an accuracy over 0.99. A different approach based on complex event processing has been also proposed. This model consists of a packet analyzer and an attack detection module and is evaluated using a Raspberry Pi.

A botnet is a collection of internet-connected computing devices under the control of an outside party without the owner's knowledge. With the control of a massively distributed amount of devices, attackers can perpetrate an attack, such as DDoS, against a specific target. Such botnets are created by compromising devices though the exploitation of existing vulnerabilities. An IoT botnet is created by controlling multiple IoT devices, which due to their lack of security and stripped-down operating systems have become an attractive target.

Two examples of such botnets are Bashlite (also known as Gafgyt) and Mirai. Bashlite uses scanners to identify vulnerable devices. Once identified, loaders establish a connection to load and run malware. Once infected, the infected bot connects to a command and control unit to wait for further instructions. Studies have found 583 command names were found in Bashlite, where Bashlite targets IoT devices to build botnets and conduct DDoS attacks. On Oct. 12, 2016, Mirai, whose source code is based on Bashlite's, exploited hundreds of thousands of infected IoT devices to perpetrate a massive DDoS attack. The attack reached an offensive capability of 1.2 terabits per second that left the U.S. East Coast without access to the internet. Mirai was able to infect such a large scale of devices by using a dictionary attack with about 60 entries, taking advantage of default credentials in IoT devices. For the purpose of studying Botnets, research groups have approached this problem by capturing the statistics of IoT devices' network traffic packets over sliding windows, generating a dataset for studying Mirai and Bashlite botnets. Existing works propose a solution for detecting Bashlite and Mirai attacks based on Autoencoders. Others propose the use of a simple frequency-based method for detecting outliers as well as the use of a Long Short-Term Memory (LSTM) model for detecting attacks. A methodology for reducing the number of features in the dataset has been previously covered in the literature. In addition, the inventors have previously tested the trimmed datasets using different simple classifiers.

Approaches, such as domain blacklisting, have been used for attenuating botnet attacks; nevertheless, these have shown a limited success as botnets adopt domain generation algorithms. In addition, the increasing number of IoT devices connecting to the internet has increased the number of resources that are used as bots due to their low or lack of security. Also, botnets are continually evolving to set their level of stealthiest which has gone so high that these remain undetected for years. In addition, botnets are using social network sites, such as Twitter and Instagram, and development platforms, such as github, as their command and control server, increasing the number of challenges as these sites cannot be blocked.

Works following a client-based application approach include Phishing-Alarm which relies on the fundamental features of a webpage's visual layout. Additionally, Off-the-Hook collects features from URL, webpage content, RDN usage, term consistency usage, and usage of multi-level datasets (mlds) to build their classification model. Furthermore, the proposal presented in PhishShield follows a heuristic-based approach, present high misclassification rates. Whereas, an exemplary approach of the present disclosure utilizes the detection of phishing attacks by extracting features from URLs and generating a model that learns their syntactical structure.

On the other hand, approaches following a back-end based application include a model based on features related to web page hosting. Others follow a phishing-target site visual similarity approach. Additional works present a model that crawls URLs and determine if the URLs direct to spam. Their approach achieves a very high accuracy but at a high computational cost which is not a resource available in most IoT devices. A framework for anomaly detection evaluated using K-means HDBSCAN, isolation forest, spectral clustering, and agglomerative clustering has also been proposed. The results show a 96.51% accuracy for detecting anomalies using network data. However, this approach does not present a solution for detecting anomalies at the client's side. A type of recurrent neural network known as long-short term memory networks (LSTM) has been used in the past for anomaly detection. Such work presents results achieving an accuracy of 97.87% for detecting DoS attacks based on an evaluation using the KDD Cup 1999 dataset which does not reflect the network behavior present in novel attacks.

In accordance with the present disclosure, various embodiments of an exemplary computer model aims to protect IoT devices owned by multiple clients as well as the back-end servers through a distributed attack detection framework powered by deep learning models based on LSTM. Such networks have become relevant due to their capability of learning long-term dependencies.

Due to the increasing number of IoT devices generated for home and commercial purposes, it is essential for corporate and academic organizations to focus on the development of defense mechanisms based on deep learning models for defending such devices. Deep learning models have the capability to analyze URL requests on devices with low computational resources as well as network information on server grade systems. IoT devices, laptops, tablets, mobile smartphones, and many others use the HTTP protocol for sending/receiving requests to/from web servers. An example of a benign and a malicious HTTP request is presented in FIGS. 2A and 2B, respectively. Each request is composed by (1) a request line containing a Method, a URL, and a protocol version; (2) the Headers section containing the HOST of interest; and (3) the Body carrying the message containing data sent by the client or the web server.

A goal of the distributed attack detection framework is to detect attacks targeting IoT devices in a distributed manner. The framework is composed of the following two elements: (i) a Distributed Convolutional Neural Network (DCNN) model embedded as an IoT device micro-security add-on for detecting phishing and application layer distributed denial of service (DDoS) and (ii) a cloud-based temporal Long-Short Term Memory (LSTM) network model hosted on the back-end for detecting botnet attacks and ingesting Convolutional Neural Network (CNN) embeddings to detect distributed phishing attacks across multiple IoT devices.

FIG. 3 illustrates a high-level topology of an exemplary distributed attack detection framework for detecting IoT attacks (phishing and DDoS) and botnets in a distributed fashion in accordance with various embodiments of the present disclosure. In FIG. 3, blocks 101 through 109 correspond to the overall pipeline of an exemplary distributed deep learning framework for IoT attack detection. Block 101 represents the IoT devices targeted by attackers which are prone to be attacked using phishing attacks, DDoS attacks, and botnets. Block 102 encompasses the extraction of the URL contained within the received HTTP request. In block 103, the extracted URL is parsed and pre-processed in order to prepare it as a valid input for training the CNN model as well as for inference once the model is trained. Block 104 represents the training of the CNN model, a main component of an exemplary IoT micro-security add-on for attack detection. Block 105 represents the trained CNN model which is used for inference for detecting attacks based on processed URLs. Block 106 represents the mapping of the embeddings in the last hidden layer of the CNN models across multiple IoT devices. These are aggregated through LSTM models in the back-end servers. Block 107 is the data fusion that takes place on the back-end servers hosted in the cloud. This approach enables the detection of distributed attacks, such as DDoS, as well as others attack types that cannot be detected by the micro-security add-on in the IoT device. Block 108 represents the training of the LSTM model which runs on the back-end in the cloud, where the model focuses on detecting attacks requiring complex data analysis of network traffic and the pre-processed fused data. Block 109 represents the inference performed by the trained LSTM model for detecting distributed attacks and botnets.

For enforcing security on user devices such as smart phones, smart watches, and other IoT devices, systems and methods of the present disclosure use an attack detection IoT micro-security add-on. In various embodiments, the micro-security add-on is a light-weight module capable of running on devices with low computational and power resources, a common characteristic of IoT devices. Such an approach opens the opportunity for developing a distributed attack detection model without requiring users to install additional software. Since this computer model analyzes data on the IoT device, it honors a client's privacy by maintaining the data on the device. At its core, the add-on is hosted in a machine learning (ML) engine capable of training a ML model, such as a CNN, and inferring whether a request is valid or is attempting to perpetrate an attack to the IoT device. This type of mechanism can be used for training, validating, and testing deep learning models that analyze incoming Internet traffic in real-time that could potentially carry harmful attacks. Furthermore, such an ML engine allows the device to import existing deep learning models, develop new models, or re-train imported models with new Internet traffic data.

In various embodiments, the IoT micro-security add-on, at the device, hosts a CNN model, which facilitates the real-time detection of network attacks. For example, phishing and application-based DDoS attacks are detected by feeding features generated from parsed URLs. The CNN model is trained with labeled normal and abnormal URLs that allows the model to learn from these features and adjust the weights for distinguishing normal traffic, as well as phishing and DDoS attacks in the inference phase.

Furthermore, the embedding in the last hidden layer of the CNN model is mapped to back-end servers, which is then aggregated through LSTM models with the embeddings of other IoT devices for data fusion. Data fusion takes place at the back-end servers hosted in the cloud, allowing for the detection of distributed attacks, such as DDoS, including those that are not detected by the CNN model on the IoT device. Since the back-end servers are hosted in a cloud environment, it allows the LSTM inference ingesting of multiple CNN embeddings to utilize a large pool of distributed computing resources to perform this task.

Figure 4:
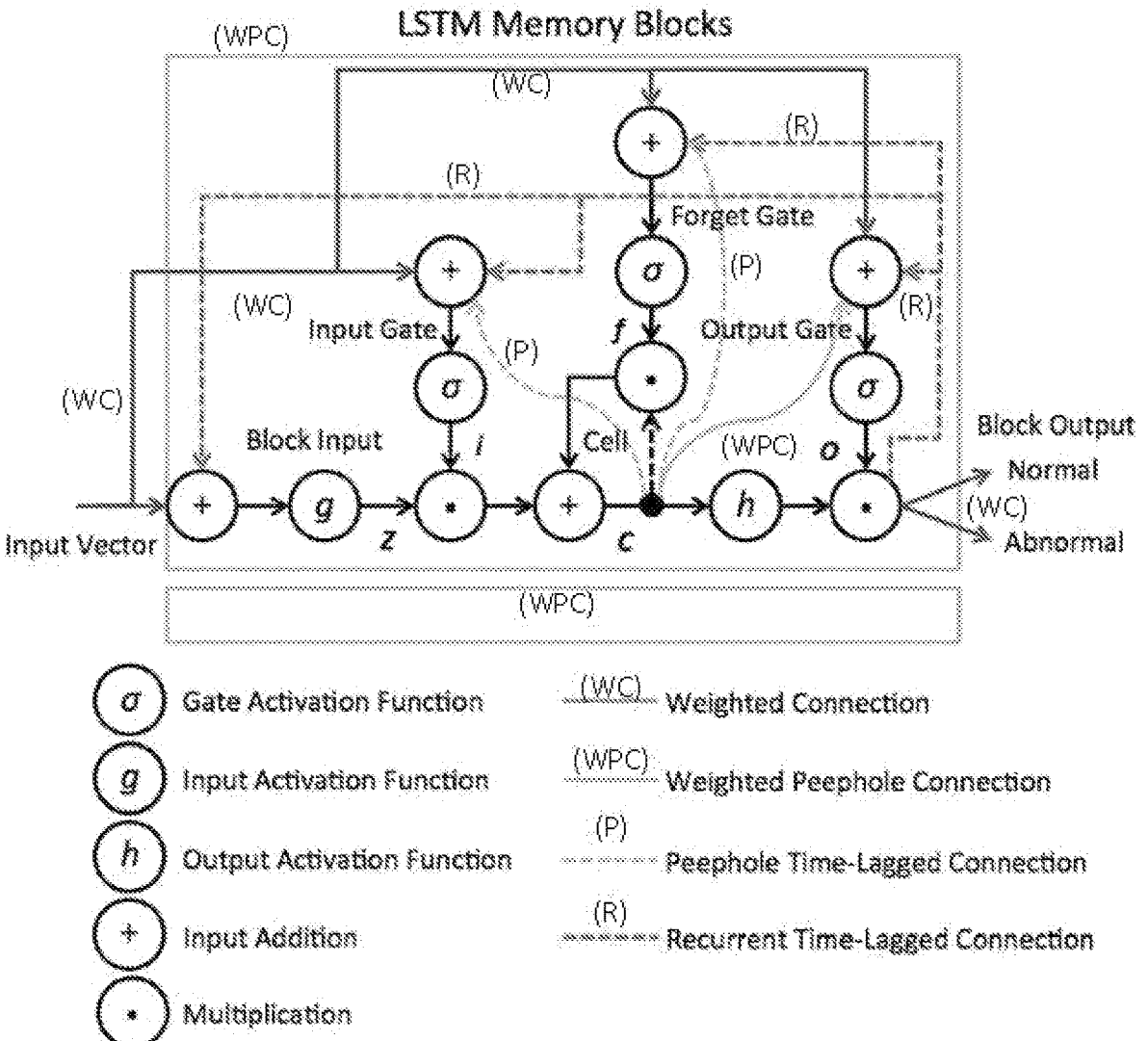
FIG. 4 shows an exemplary model of Long Short-Term Memory (LSTM) memory blocks in accordance with various embodiments of the present disclosure.

The second component of an exemplary distributed attack detection framework has a computer network model based on LSTM cells, which is a variant of recurrent neural networks. In various embodiments, the LSTM model is hosted on back-end servers with greater computational capabilities. Due to these capabilities, the LSTM model focuses on detecting attacks that require complex data analysis of the network traffic. The LSTM block presented in FIG. 4 features an input gate, a forget gate, an output gate, the block input, peephole connections, the output activation function, and a single cell. The block's output is recurrently connected to all gates and the block's input. In order to further understand how the information of the input vector is being computed within the LSTM block, the calculations for the forward pass, back propagation through time, and the gradients for the weights are explored below.

For the forward pass, $x^t$ is defined as the input vector at time t where N is the number of LSTM blocks and M is the number of inputs. Furthermore, $Z^t$ denotes the block input, $i^t$ denotes the input gate, $f^t$ denotes the forget gate, $c^t$ denotes the cell, $o^t$ denotes the output gate, and $y^t$ denotes the block's output. In addition, the weights are defined as follows:

Input Weights: $W_z$, $W_s$, $W_f$, $W_o$, $\varepsilon \Re^{N \times M}$
Recurrent Weights: $R_z$, $R_s$, $R_f$, $R_o \varepsilon \Re^{N \times M}$
Peephole Weights: $p_s$, $p_f$, $p_o$, $\varepsilon \Re^N$
Bias Weights: $b_z$, $b_s$, $b_o$, $\varepsilon \Re^N$ The calculations corresponding to the forward pass are represented in the following equations:

$$Z^{-t}=W_z x^t+R_z y^{t-1}+b_z$$

$$Z^t=g(Z^{-t}) \qquad \text{Block Input:}$$

$$i^{-t}W_i x^t+R_i y^{t-1}+p_i\odot c^{t-1}b_i$$

$$i^t=\sigma(i^{-t}) \qquad \text{Input Gate:}$$

$$f^{-t}=W_f x^t+R_f y^{t-1}+p_f\odot c^{t-1}b_f$$

$$f^t=\sigma(f^{-t}) \qquad \text{Forget Gate:}$$

$$c^t=Z^t\odot i^t=c^{t-1}\odot f^t \qquad \text{Cell:}$$

$$o^{-t}=W_o x^t=R_o y^{t-1}+p_o\odot c^t=b_o$$

$$o^t=(o^{-t}) \qquad \text{Output Gate:}$$

$$y^t=h(c^t)\exists o^t \qquad \text{Block Input:}$$

$\Delta^t$ represents the vector of deltas passed from the previous layer and the point-wise nonlinear activation functions are denoted by $\sigma$, g, and h. Furthermore, in an exemplary model, the logistic sigmoid is used for gate activation function and the hyperbolic tangent activation function is used for block input and output.

Logistic Sigmoid:

$$\sigma(x)=\frac{1}{1+e^{-x}}$$

Hyperbolic Tangent: g(x)=h(x)=tanh(x)

The Deltas inside the LSTM are calculated as per the following equations:

$$\delta y^t=\Delta^t+R_z^T\delta Z^{t+1}+R_i^T\delta i^{t+1}+R_f^T\delta f^{t+1}+R_o^T\delta o^{t+1}$$

$$\delta o^t=\delta y^t\odot h(c^t)\odot \sigma'(o^{-t})$$

$$\delta c^t=\delta y^t\odot o^t\odot h'(c^t)+p_o\odot\delta o^t+p_i\odot\delta i^{t+1}+p_f\odot\delta f^{t+1}+\delta c^{t+} {}_1\odot f^{t+1}$$

$$\delta f^t=\delta c^t\odot c^{t-1}\odot \sigma'(f^{-t})$$

$$\delta i^t=\delta c^t\odot Z^t\odot \sigma'(i^{-t})$$

$$\delta Z^t=\delta c^t\odot i^t\odot g'(Z^{-t}).$$

The deltas from the inputs are passed to the second layer and are computed with the following equation:

$$\delta x^t=W_z^t\delta Z^t+W_i^t\delta i^t+W_f^t\delta f^t+W_o^t\delta o^t.$$

Finally, the gradients from the weights are calculated with the equations presented below where $\varrho$ can be any of $\bar{z}$, $\bar{I}$, $\bar{f}$, $\bar{o}$.

$$\delta W_\varrho=\Sigma_{t=0}^T\langle\delta\varrho^t,x^t\rangle\ \delta p_i=\Sigma_{t=0}^{T-1}c^t\odot\delta i^{t+1}$$

$$\delta R_\varrho=\Sigma_{t=0}^T\langle\delta\varrho^{t+1},y^t\rangle\ \delta p_f=\Sigma_{t=0}^{T-1}c^t\odot\delta f^{t+1}$$

$$\delta b_\varrho=\Sigma_{t=0}^T\langle\delta\varrho^t\rangle\ \delta p_o=\Sigma_{t=0}^Tc^t\odot\delta o^t.$$

Figure 5:
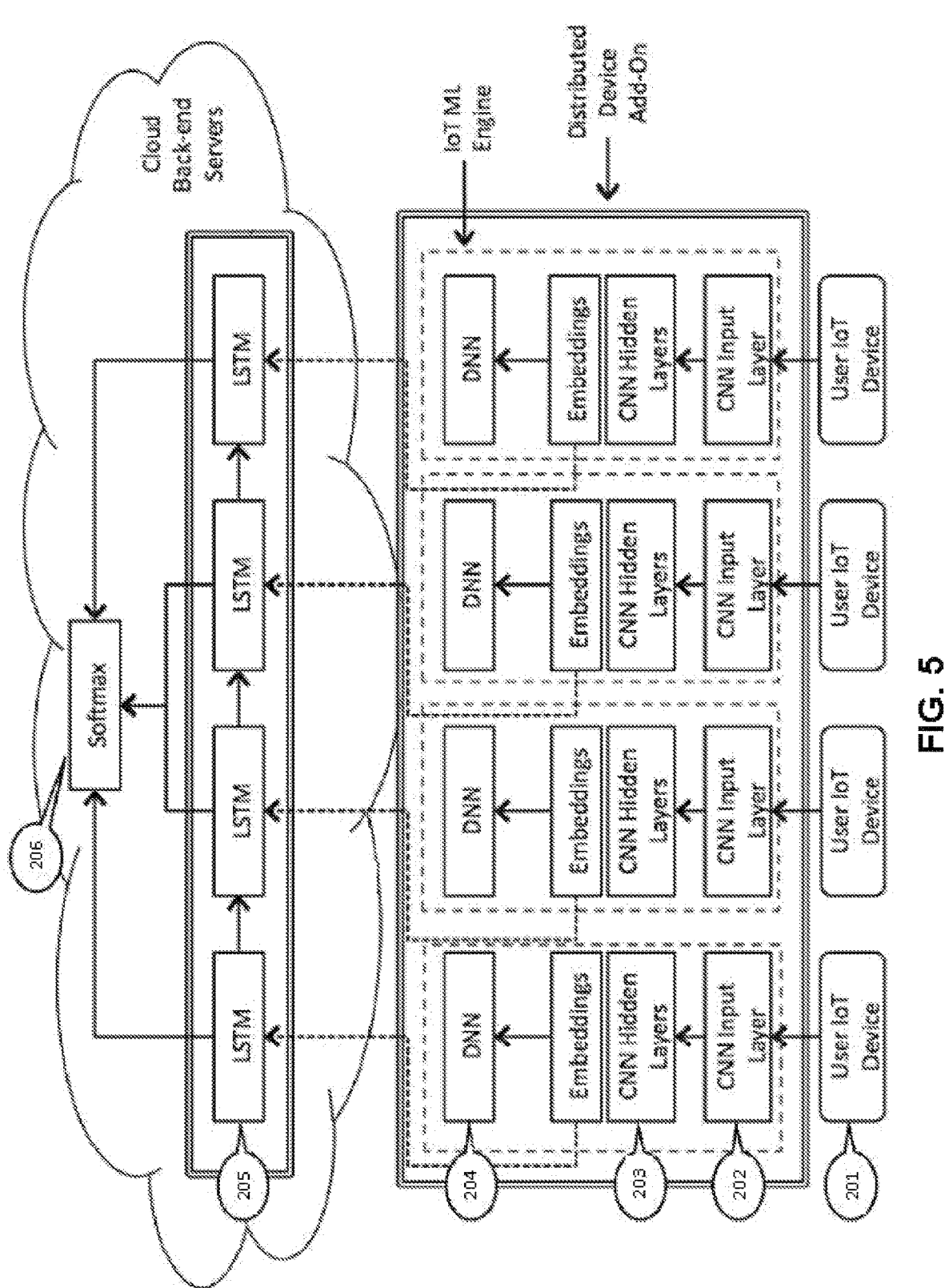
FIG. 5 illustrates an exemplary distributed deep learning framework featuring a micro-security add-on based on a convolutional neural network (CNN) hosted in IoT device(s) and an LSTM detection model hosted in back-end server(s) in accordance with various embodiments of the present disclosure.

FIG. 5 presents an overview of an exemplary distributed CNN and LSTM architecture. For simplicity, the distributed solution can be viewed as a standard CNN running in IoT devices and a cloud-based LSTM distributed across multiple back-end servers, in various embodiments.

In FIG. 5, blocks 201 through 206 correspond to the architecture of an exemplary distributed attack detection framework. Block 201 represents the IoT device where the micro-security add-on is hosted. Blocks 202 to 204 represent the different layers composing the CNN model. Block 202 represents the input layer of the CNN model where pre-processed URLs are ingested. Block 203 is the set of hidden layers in the CNN model. Block 204 shows embeddings in the last hidden layer of the CNN model. Block 205 is the LSTM model hosted in the back-end cloud, where the LSTM computer model aggregates the received embeddings, performs the detection of distributed attacks across multiple IoT devices, and performs the detection of botnet attacks. Block 206 represents a function of the LSTM model (e.g., softmax function) that classifies input data as benign or malicious based on a probability distribution.

In brief, the present disclosure presents a computer model framework that enables the detection of attacks both at the client's side and the back-end simultaneously. In various embodiments, the client's side hosts a micro-security add-on running a convolutional neural network (CNN) model for detecting DDoS and phishing attacks. In addition, embeddings from the CNN model are passed to the back-end long-short term memory based model for detecting distributed attacks across multiple IoT devices in addition to botnets. To the best of the inventors' knowledge, no other works present a solution for detecting IoT attacks both at the device level and at the back-end in a distributed fashion, thereby allowing for detection and defense of an IoT device from phishing attacks at the point of origin.

Accordingly, embodiments of the present disclosure provide a novel distributed Long Short-Term Memory (LSTM) neural network framework, which maps sections of a Convolutional Neural Network (CNN) into a distributed computing hierarchy running on client computing devices to detect and defend a network attack at the point of origin. Additionally, embodiments of the present disclosure provide a joint training method that minimizes communication and resource usage for attack detection in IoT devices and maximizes usefulness of extracted features which are utilized at the back-end server, while allowing malicious URL classification via client's machine learning (ML) engine hosted on the IoT devices (to minimize service disruption). Further, embodiments of the present disclosure provide aggregation schemes that allow automated fusion of multiple URL requests to improve the overall performance (accuracy and fault tolerance) of the system.

Figure 6:
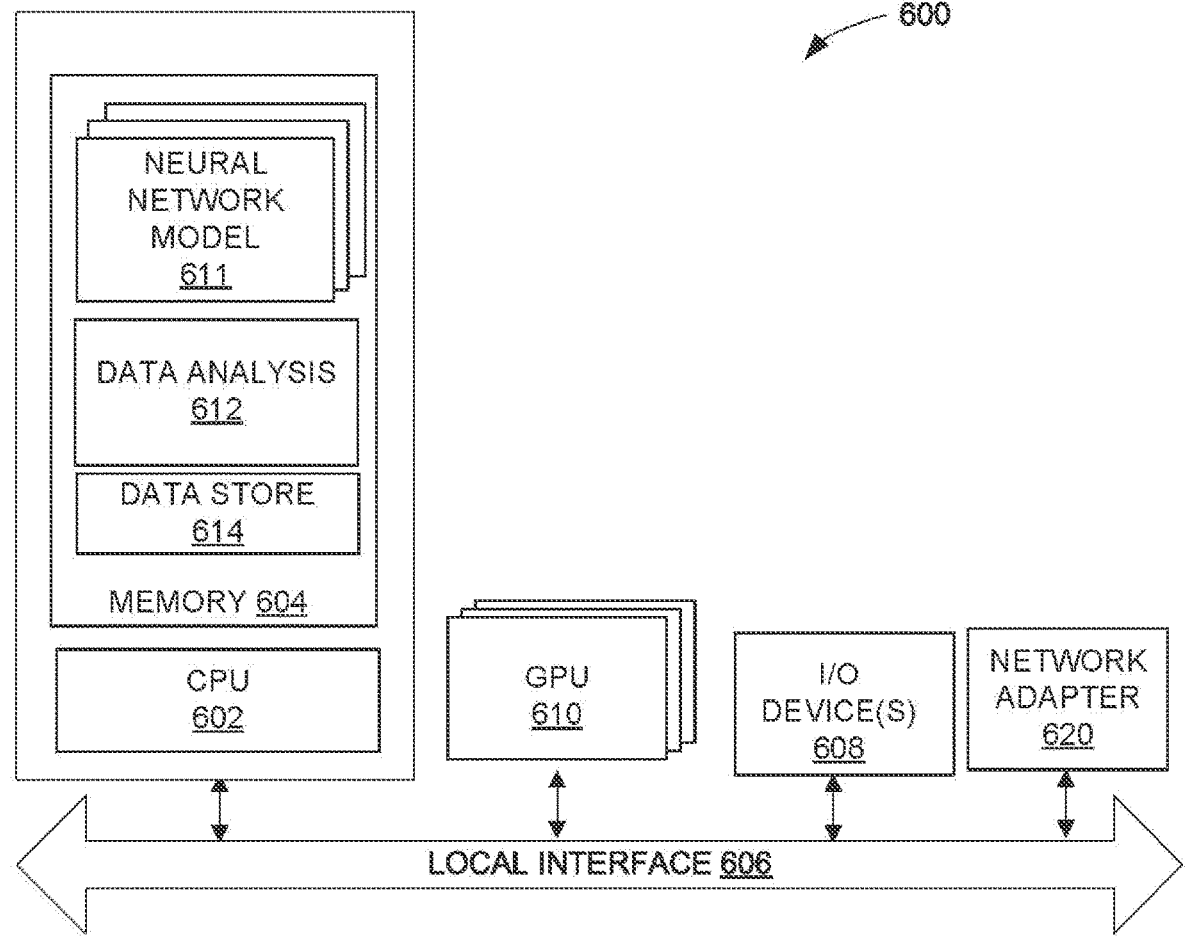

FIG. 6 depicts a schematic block diagram of a computing device 600 that can be used to implement various embodiments of the present disclosure, such as, but not limited to, one of the IoT devices or the server computing devices within an exemplary distributed attack detection system. An exemplary computing device 600 includes at least one processor circuit, for example, having a processor 602 and a memory 604, both of which are coupled to a local interface 606, and may include one or more input and output (I/O) devices 608. The local interface 606 may comprise, for example, a data bus with an accompanying address/control bus or other bus structure as can be appreciated. The computing device 600 may further include Graphical Processing Unit(s) (GPU) 610 that are coupled to the local interface 606 and may utilize memory 604 and/or may have its own dedicated memory. The CPU and/or GPU(s) can perform various operations such as image enhancement, graphics rendering, image/video processing, recognition (e.g., text recognition, object recognition, feature recognition, etc.), image stabilization, machine learning, filtering, image classification, and any of the various operations described herein.

Stored in the memory 604 are both data and several components that are executable by the processor 602. In particular, stored in the memory 604 and executable by the processor 602 are code for implementing one or more neural network model(s) 611 (e.g., a CNN model, a LSTM model, etc.) and/or data analysis code 612 for analyzing network data from one or more IoT devices and detecting a network attack across one or more IoT devices. Also stored in the memory 604 may be a data store 614 and other data. In addition, an operating system may be stored in the memory 604 and executable by the processor 602. The I/O devices 608 may include input devices, for example but not limited to, a keyboard, touchscreen, mouse, etc. Furthermore, the I/O devices 608 may also include output devices, for example but not limited to, speaker, audio output port, a printer, display, etc. Additionally, a network adapter 620 may also be coupled to computing device to enable the computing device to become coupled to other systems, computer devices and/or remote storage devices through intervening private or public networks. Modems, cable modems, Ethernet cards, and wireless transceivers are examples of different types of network adapter that may be used with the computing device 600.

Certain embodiments of the present disclosure can be implemented in hardware, software, firmware, or a combination thereof. If implemented in software, the data analysis logic or functionality are implemented in software or firmware that is stored in a computer-readable medium, such as memory, and that is executed by a suitable instruction execution system. If implemented in hardware, the data analysis logic or functionality can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. In the context of this document, a computer-readable medium can be any means that can contain, store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

It should be emphasized that the above-described embodiments of the present invention are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Therefore, having thus described the invention, at least the following is claimed:

1. A system comprising:
at least one processor of a client device; and
memory of the client device that is configured to communicate with the at least one processor, wherein the memory stores instructions that, in response to execution by the at least one processor, cause the at least one processor to perform operations comprising:
executing, on the client device, a convolutional neural network model that is configured to detect a network attack on the client device;

receiving an HTTP request and extracting a uniform resource locator contained within the HTTP request;
inputting the uniform resource locator in the convolutional neural network model;
receiving an output from the convolutional neural network model that classifies the uniform resource locator as being directed to a network attack on the client device; and
transmitting, from the client device, embeddings of a hidden layer of the convolutional neural network model to one or more computer servers that are hosting a recurrent neural network model for detecting a distributed network attack across a plurality of client devices.

2. The system of claim 1, wherein the client device comprises an Internet of Things device.

3. The system of claim 1, wherein the client device comprises a mobile smartphone.

4. The system of claim 1, wherein the network attack comprises a botnet attack.

5. The system of claim 1, wherein the network attack comprises a phishing attack.

6. The system of claim 1, wherein the operations further comprise training the convolutional neural network model using incoming Internet traffic.

7. The system of claim 1, further comprising:
at least one processor of the one or more computer servers; and
memory of the one or more computer servers that is configured to communicate with the at least one processor of the one or more computer servers, wherein the memory of the one or more computer servers stores instructions that, in response to execution by the at least one processor of the one or more computer servers, cause the at least one processor of the one or more computer servers to perform operations comprising:
ingesting and aggregating embeddings of a hidden layer of the convolutional neural network model from the plurality of client devices into the recurrent neural network model, wherein the plurality of client devices comprises the client device; and
detecting, by the recurrent neural network model, the distributed network attack across the plurality of client devices.

8. The system of claim 7, wherein the distributed network attack comprises a distributed denial of service attack.

9. The system of claim 7, wherein the recurrent neural network model comprises a long short-term memory neural network model.

10. A method comprising:
executing, by a client computing device, a convolutional neural network model that is configured to detect a network attack on the client computing device;
receiving, by the client computing device, an HTTP request;
extracting, by the client computing device, a uniform resource locator contained within the HTTP request;
inputting, by the client computing device, the uniform resource locator in the convolutional neural network model;
receiving, by the client computing device, an output from the convolutional neural network model that classifies the uniform resource locator as being directed to a network attack on the client computing device; and
transmitting, by the client computing device, embeddings of a hidden layer of the convolutional neural network model to one or more computer servers that are hosting a recurrent neural network model for detecting a distributed network attack across a plurality of client computing devices.

11. The method of claim 10, wherein the client computing device comprises an Internet of Things device.

12. The method of claim 10, wherein the client computing device comprises a mobile smartphone.

13. The method of claim 10, wherein the network attack comprises a botnet attack.

14. The method of claim 10, wherein the network attack comprises a phishing attack.

15. The method of claim 10, further comprising training, by a machine learning engine of the client computing device, the convolutional neural network model using incoming Internet traffic.

16. The method of claim 10, further comprising:

ingesting and aggregating, by the one or more computer servers, embeddings of a hidden layer of the convolutional neural network model from the plurality of client computing devices into the recurrent neural network model, wherein the plurality of client computing devices comprises the client computing device; and detecting, by the recurrent neural network model of the one or more computer servers, the distributed network attack across the plurality of client computing devices.

17. The method of claim 16, wherein the distributed network attack comprises a distributed denial of service attack.

18. The method of claim 16, wherein the recurrent neural network model comprises a long short-term memory neural network model.

19. A non-transitory computer-readable medium comprising machine-readable instructions, wherein the instructions, when executed by at least one processor of a client computing device, cause a computing device to at least:

execute, on the client computing device, a convolutional neural network model that is configured to detect a network attack on the client computing device;

receive an HTTP request and extracting a uniform resource locator contained within the HTTP request;

input the uniform resource locator in the convolutional neural network model;

receive an output from the convolutional neural network model that classifies the uniform resource locator as being directed to a network attack on the client computing device; and transmit, from the client computing device, embeddings of a hidden layer of the convolutional neural network model to one or more computer servers that are hosting a recurrent neural network model for detecting a distributed network attack across a plurality of client computing devices.

20. The non-transitory computer-readable medium of claim 19, wherein the network attack comprises a phishing attack or a botnet attack, wherein the distributed network attack comprises a distributed denial of service attack.

* * * * *